United States Patent Office 3,270,983
Patented Sept. 6, 1966

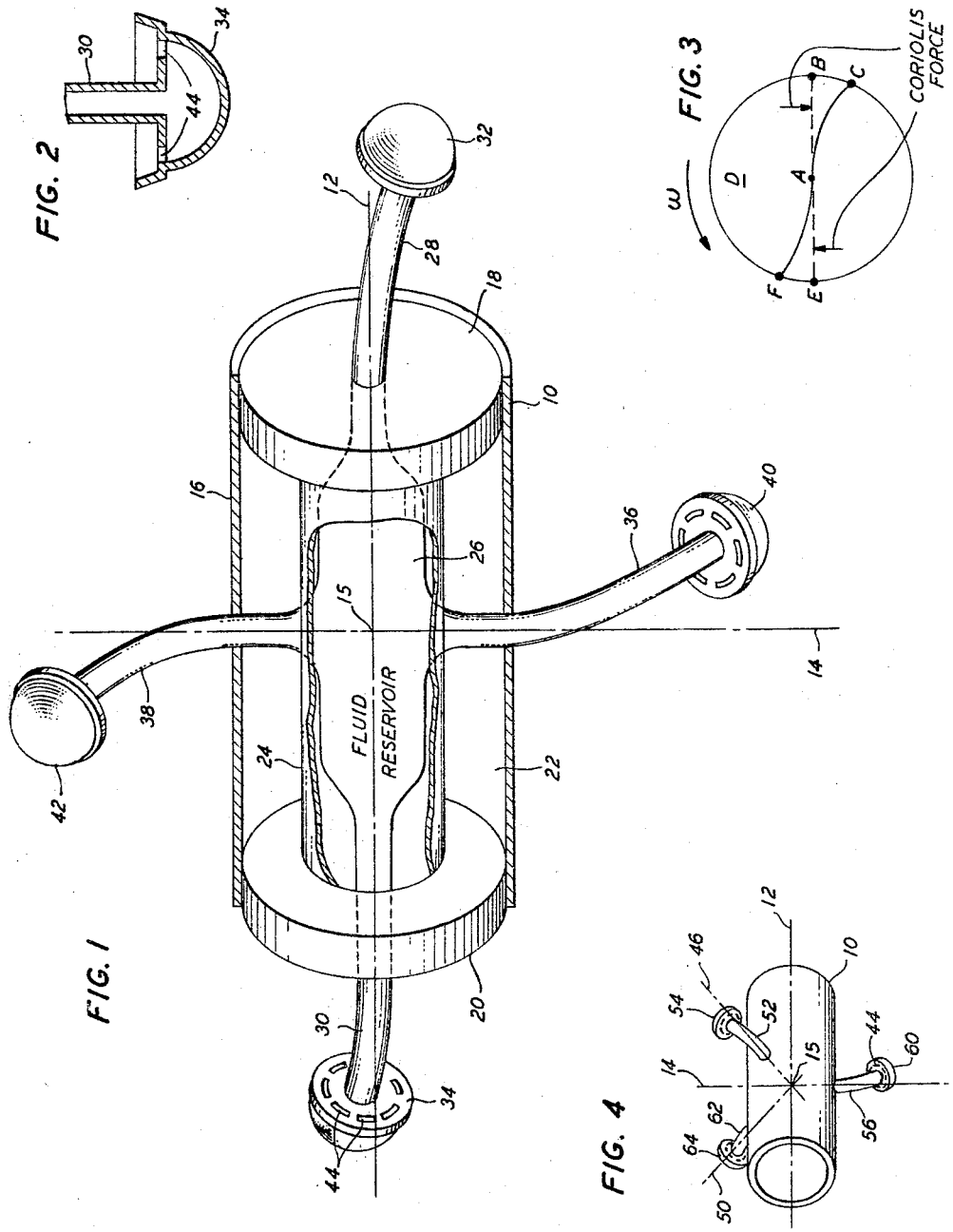

3,270,983
APPARATUS FOR REDUCING SPIN OF A
SPACE SATELLITE
Robert T. Adams, Short Hills, N.J., and Gordon Raisbeck, Lexington, Mass.; said Adams assignor to International Telephone and Telegraph Corporation, New York, N.Y., a corporation of Maryland, and said Raisbeck assignor to Bell Telephone Laboratories, Incorporated, New York, N.Y., a corporation of New York
Filed Nov. 1, 1961, Ser. No. 149,416
11 Claims. (Cl. 244—1)

This invention relates to space satellites and, more particularly, to apparatus for reducing the spin of space satellites.

The orientation of a satellite orbiting in space is critical in most applications for one reason or another. For example, a directional antenna is frequently fixed to the satellite in order to transmit to or receive information from earth or other stations, including other heavenly bodies or satellites. Improper orientation of the satellite would, in this case, render the directional antenna ineffective to carry on communications with earth and/or other remote stations.

During the release of a space satellite from its launching vehicle into orbit, a multitude of unwanted torques and forces are imparted to the satellite. Prior to attempting to control the orientation of the obiting satellite, it is desirable to eliminate all or as much as possible of the rotatoin or spin of the satellite introduced by its release from the launching vehicle. Various schemes have been devised for damping the spin and space satellites in contemplation of application or orientation control. For the most part, these arrangements are cumbersome and complicated and are limited to the reduction of spin about a single axis.

It is, therefore, the object of the present invention simply and effectively to reduce the spin about one or more axes of a space satellite.

In accordance with the above object, two flexible, normally straight tubes, each of which is terminated at one end by a recurved nozzle, are appended radially to opposite sides of the surface of a space satellite. A reservoir of fluid under pressure located within the satellite is connected to the flexible tubes so that fluid from the reservoir escapes through the tubes and is redirected back along the axis of the tubes by the recurved nozzles.

Rotational components of the space satellite about any axis other than that of the tubes cause Coriolis forces to be exerted upon the fluid traveling through the tubes in the directions of the tangential velocity of these components of the rotating satellite. The tubes, because of their flaccid nature, yield to the Coriolis forces and bend as though being subjected to a drag. This effect, however, does not depend upon the existence of an atmosphere or upon angular acceleration of the satellite. When the tubes bend, the new direction of the fluid ejected from the nozzles is resolvable into, among others, components tangential to the above components of rotation of the satellite. The fluid ejected from the nozzles tangential to these components of the rotation of the satellite imparts a torque to the satellite which counteracts these components of the rotation of the satellite. In this way, the satellite spin gives rise to a torque by virtue of the Coriolis force which opposes and diminishes the spin of the satellite. The result is a degenerative or damping action.

In order to damp rotational components about the axis of the tubes, a second pair of tubes terminated in nozzles may be appended radially to opposite sides of the satellite surface in a line perpendicular to the axis of the first pair of tubes. As described above with regard to the first set of tubes, the Coriolis force directs the nozzle flow from the second pair of tubes in a direction to cause counteraction of the rotation of the satellite about the axis of the first set of tubes. Spin reduction of a space satellite about all its axes is thus realized by two pairs of tubes situated on the surface of the satellite along axes perpendicular to each other.

The above and other features of the invention will be discussed in detail in the following specification taken in conjunction with the drawings in which:

FIG. 1 is a perspective view of a space satellite with rotation damping apparatus appended thereto;

FIG. 2 shows a cross-sectional view of a recurved nozzle terminating one of the flexible tubes;

FIG. 3 illustrates the effect of the Coriolis force upon a body undergoing translational motion; and FIG. 4 shows a perspective view of an alternative arrangement for damping rotation of a space satellite.

FIG. 1 depicts a space satellite 10 having a longitudinal axis 12 and a transverse axis 14 which intersect at point 15, conveniently located at the center of mass of the satellite. Satellite 10 is shown as a cylindrical body having a side wall 16 and end walls 18 and 20 within which are contained a storage compartment 22 defined by walls 16, 18 and 20 and an inner wall 24. Storage compartment 22 could house, for example, electronic transmitting and receiving equipment if satellite 10 is to be used as a radio repeater. Enclosed in inner wall 24 is a fluid reservoir 26 which could accommodate any number of different fluid systems capable of producing propulsion. For example, compressed carbon dioxide might be contained in reservoir 26. Along axis 12, normally straight, flexible tubes 28 and 30 are situated external to satellite 10 and connected to reservoir 26 at ends 18 and 20, respectively. Recurved nozzles or jets 32 and 34 terminate tubes 28 and 30, respectively, and redirect fluid escaping from reservoir 26 through openings 44 in nozzles 32 and 34 back along axis 12. In a similar fashion, flexible tubes 36 and 38 are located external to satellite 10 along axis 14. Tubes 36 and 38 are likewise terminated in recurved nozzles 40 and 42, respectively, and are connected at opposite sides of cylindrical wall 16 to fluid reservoir 26. FIG. 2 illustrates nozzle 34, also exemplary of nozzles 32, 40, and 42, in cross-section.

Although not shown, the fluid flow through openings 44 of nozzles 32, 34, 40, and 42 could be controlled by valves if it is desirable to conserve the fluid escaping from reservoir 26. This detail is not critical to the invention, however, as will be seen hereinafter.

It is well known that an object which is moving in a straight line with a constant space velocity is deflected laterally relative to a rotating reference. This phenomenon can be described by a force known as the Coriolis force acting upon the moving object in a direction opposite to the tangential velocity of the rotating reference. FIG. 3 illustrates the way in which the Coriolis force affects moving objects. There, objects traveling with a velocity $v$ in a straight line from points A to B and A to E with respect to an arbitrarily chosen fixed reference H, not represented in FIG. 3, move with respect to a reference D, rotating with an angular velocity $\omega$, in a path curved away from points B and E in the direction opposite to that of the angular velocity of reference D, toward points C and F, respectively. The Coriolis force $F_c$, which may be expressed by the following formula, accounts for the motion with respect to reference D of the objects transverse to paths AB and AE:

$$F_c = 2\omega v$$

The effects of the Coriolis force caused by rotation of satellite 10 about axis 14, which represents any axis in a plane perpendicular to axis 12 and passing through point 15, will be considered first. Fluid moving from the reservoir 26 through tubes 28 and 30 is acted upon by the Coriolis force in the same manner as the objects moving from A to B and A to E in FIG. 3. The Coriolis force acts in a direction diametrically opposite to the direction of the tangential velocity of the rotation of satellite 10 about axis 14. Whereas the fluid expelled from nozzles 32 and 34 in the absence of the Coriolis force, i.e., when satellite 10 is not rotating about axis 14, is completely directed back along axis 12, the Coriolis force exerted upon tubes 28 and 30 bends them, causing the fluid expelled from nozzles 32 and 34 to form a finite angle with axis 12. Hence, the direction of flow of fluid from nozzles 32 and 34 may be resolved into components along axis 12 and perpendicular to axis 12 in the direction of rotation of satellite 10 about axis 14. The fluid flowing from nozzles 32 and 34 perpendicular to axis 12 exerts an opposite force upon satellite 10 which constitutes a counteracting torque to the rotation of satellite 10 about axis 14.

Summarizing, the spin of satellite 10 about axis 14 causes a Coriolis force proportional to that spin (as indicated by the formula above) to act upon tubes 28 and 30. Tubes 28 and 30 bend according to the magnitude and direction of the Coriolis force. The extent of bending undergone by tubes 28 and 30 determines the angle that the fluid flowing from nozzles 32 and 34 forms with axis 12 and hence the magnitude of the force perpendicular to axis 12 exerted on satellite 10. In this manner the rotation of satellite 10 about axis 14 is made to degenerate. The extent of damping of the rotation of satellite 10 about axis 14 may be controlled by adjusting the various parameters of the system, for example, the flexibility of the tubes and the density, velocity, and amount of fluid flowing through the recurved nozzles. It should be noted that the spin reduction of the invention is not dependent upon the presence of an atmosphere or an angular acceleration of the satellite.

The use of tubes at opposite sides of satellite 10 to damp rotation about axis 14 results in a cancellation of forces exerted upon satellite 10 by the components of fluid motion from nozzles 32 and 34 along axis 12. In the event that translational motion introduced into the orbit of satellite 10 is not objectionable for a specific application, a single flexible tube and nozzle might be employed to damp satellite rotation about axis 14.

Tubes 28 and 30 and their nozzles 32 and 34 do not affect, i.e., diminish, the rotation of satellite 10 about axis 12. Spin reduction about axis 12 may be accomplished, however, by tubes 36 and 38 and their nozzles 40 and 42 situated along axis 14 in a fashion similar to that discussed above with reference to spin reduction along axis 14.

The total rotation of satellite 10, no matter how complex, is susceptible of resolution into component rotations about two mutually perpendicular axes, each in turn perpendicular to the axis of a pair of tubes terminated with nozzles as described above. Accordingly, the location of the tube pairs, aside from being mutually perpendicular, is not critical. Generally, a pair of tubes terminated in nozzles, as described above, appended to an object at any diametrically opposite points of its surface reduces the spin of the object about all but the axis of the tubes. To reduce the spin of the object about that axis, thus completing the damping action, two tubes terminated in nozzles are connected to the object at any diametrically opposite points of its surface forming a line perpendicular to the first axis.

FIG. 4 discloses an alternative arrangement for obtaining the spin reduction discussed above with regard to the apparatus of FIG. 1. Three tubes 52, 56, and 62, terminated with nozzles 54, 60 and 64, respectively, of the type illustrated in FIG. 2, are appended radially to the surface of satellite 10 along axes 46, 14 and 50, respectively. Axes 46, 14 and 50 are equiangular with respect to one another, lie in a common plane which is perpendicular to axis 12, and cross at point 15. Each tube and nozzle combination damps rotation about all but its axis, which rotation is damped by the remaining two tube and nozzle combinations. For example, the tube 52 and nozzle 54 combination causes spin reduction about all axes but axis 46. However, spin about axis 46 is reduced by the combinations of tube 56 and nozzle 60 and tube 62 and nozzle 64. Accordingly, reduction in rotation about all axes is effected. Moreover, the forces caused by fluid flow from the nozzles in the radial direction which result in translational motion tend to cancel one another in the configuration of FIG. 4.

What is claimed is:

1. In a rotating space satellite, means for damping the rotational motion of said satellite comprising a reservoir of fluid under pressure situated within said satellite, at least one jet located external to said satellite oriented to eject fluid only toward the center of mass of said satellite without imparting torque to said satellite when said satellite is stationary, and means for applying said fluid to said jet and means for orienting said jet to eject fluid in the direction of the tangential velocity of rotation of said satellite to impart an opposing torque to said satellite responsive to the Coriolis force exerted upon said fluid during transit between said reservoir and said jet when said satellite is rotating.

2. In a rotating space satellite, means for damping the rotational motion of said satellite about any axis through the center of mass of said satellite perpendicular to a first axis through the center of mass of said satellite comprising a reservoir of fluid under pressure situated within said satellite, a pair of jets located external to and at opposite sides of said satellite in a line parallel to said first axis, said jets being oriented to eject fluid along said first axis toward the center of mass of said satellite without imparting torque to said satellite when said satellite is stationary, and means for applying said fluid to said jets for orienting said jet to eject fluid in the direction of the tangential velocity of said rotation of said satellite when said satellite is rotating to impart an opposing torque to said satellite responsive to the Coriolis force exerted upon said fluid during transit between said reservoir and said jets.

3. In a spinning space satellite, means for reducing the spin about all but one axis of said satellite comprising a source of fluid under pressure, at least one tube normally protruding radially from the surface of said satellite along said one axis, said tube being connected to said source, the unconnected extremity of said tube being movable away from said axis, and a nozzle terminating said tube, said nozzle directing fluid toward the center of mass of said satellite without imparting torque to said satellite when said tube is in its normal position along said axis whereby the Coriolis force exerted upon the fluid flowing through said tube by the spin of said satellite directs the fluid flowing from said nozzle to create a torque opposing the spin of said satellite about all but said one axis.

4. In a spinning space satellite, means for reducing the spin about all but one axis of said satellite comprising a source of fluid under pressure, a pair of tubes normally protruding radially in opposite directions from the surface of said satellite along said one axis, said tubes being connected to said source, the unconnected extremity of each of said tubes being movable away from said axis, and a pair of nozzles terminating said tubes, said nozzles each directing fluid toward the center of mass of said satellite without imparting torque to said satellite when its related tube is in the normal position along said axis whereby the Coriolis force exerted upon the fluid flowing through said tubes by the spin of said satellite directs the fluid flowing from said nozzles to create a torque opposing the spin of said satellite about all but said one axis.

5. In a spinning space satellite, means for reducing the spin of said satellite comprising a reservoir of fluid under pressure located within said satellite, at least one normally straight flexible tube connected to said reservoir, said tube attached to and protruding radially from the surface of said satellite, and a recurved nozzle terminating said flexible tube to redirect the fluid expelled by said nozzle tangential to the axis of said tube when the satellite is not spinning such that the Coriolis force exerted upon the fluid flowing through said tube during rotation of said satellite orients said nozzle to expel fluid in a direction to produce a torque counteracting the spin of said satellite.

6. In a spinning space satellite, a source of fluid under pressure located within said satellite, a pair of cup-shaped nozzles located external to and opposite to one another and facing the surface of said satellite, normally straight flexible tubes interconnecting said source with said nozzles, whereby the Coriolis force developed by the spin of said satellite upon the fluid flowing in said tubes bends said tubes to direct said fluid emanating from said nozzles in a direction opposing the rotation of said satellite.

7. In a rotating space satellite, means for reducing the spin of said satellite about two perpendicular axes intersecting at the center of mass of said satellite comprising a reservoir of fluid under pressure situated within said satellite, at least one jet located external to said satellite along each of said axes and oriented to eject fluid only along its respective axis toward the center of mass of said satellite without imparting torque to said satellite when said satellite is stationary, means for applying said fluid to said jets and for orienting each of said jets to eject fluid in the direction of the tangential velocity of rotation of said satellite when said satellite is rotating to impart an opposing torque to said satellite responsive to the Coriolis force exerted upon said fluid during transit between said reservoir and said jets.

8. In a spinning space satellite, means for reducing the spin of said satellite comprising a source of fluid under pressure, a first pair of tubes normally protruding radially in opposite directions from the surface of said satellite, a second pair of tubes normally protruding radially in opposite directions from the surface of said satellite perpendicularly to the protrusion of said first pair of tubes, all said tubes being connected to said source, the unconnected extremities of all of said tubes being deflectible away from the normal radial position, and nozzles terminating each of said tubes, said nozzles each directing fluid radially toward the center of mass of said satellite without imparting torque to said satelllite when its related tube is in the normal radial position, whereby the Coriolis force exerted upon the fluid flowing through said tubes by the spin of said satellite directs the fluid flowing from said nozzles to create a torque opposing the spin of said satellite.

9. In a rotating space satellite, means for reducing the spin of said satellite about two perpendicular axes intersecting at the center of mass of said satellite comprising a reservoir of fluid situated within said satellite, a pair of flexible normally straight tubes extending from said reservoir through the surface of said satellite in opposite directions along each of said axes, and a recurved jet terminating each of said flexible tubes, said jets ejecting fluid in the directions of rotation of said satellite to mitigate the rotation thereof.

10. In a rotating space satellite, means for damping the rotational motion of said satellite comprising a reservoir of fluid under pressure situated within said satellite, three tubes attached to and normally protruding radially from the surface of said satellite along different equiangular axes, said tubes being connected to said reservoir, the unconnected extremity of each of said tubes being movable away from its axis, and nozzles terminating said tubes, said nozzles each directing fluid toward the center of mass of said satellite when the extremity of its respective tube is in the normal position along its axis, whereby the Coriolis force exerted upon the fluid flowing through said tubes caused by the rotation of said satellite directs the fluid flowing from said nozzles to create a torque opposing the rotation of said satellite.

11. In a spinning space satellite, means for reducing the spin of said satellite comprising a source of fluid under pressure, three normally straight flexible tubes appended radially to the surface of said satellite, said tubes being located equidistant from one another on the surface of said satellite, means for connecting said tubes to said source, and recurved jets terminating said tubes, said jets being oriented to eject fluid only toward the center of mass of said satellite without imparting torque to said satellite when said satellite is stationary whereby the Coriolis force exerted upon the fluid flowing through said tubes during transit between said source and said jets directs the fluid flow from said jets in the direction of the spin of said satellite to impart an opposing torque to said satellite.

References Cited by the Examiner
UNITED STATES PATENTS

| | | | |
|---|---|---|---|
| 2,620,882 | 12/1952 | Morain | 170—135.4 |
| 2,717,043 | 9/1955 | Isacco | 170—160.12 X |

FERGUS S. MIDDLETON, *Primary Examiner.*